(12) United States Patent
Nakamura et al.

(10) Patent No.: US 10,794,610 B2
(45) Date of Patent: Oct. 6, 2020

(54) INDOOR UNIT OF AIR-CONDITIONING APPARATUS HAVING AN INFRARED SENSOR

(71) Applicant: Mitsubishi Electric Corporation, Tokyo (JP)

(72) Inventors: Toshinori Nakamura, Tokyo (JP); Takuya Mukoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 11 days.

(21) Appl. No.: 16/071,618

(22) PCT Filed: Dec. 8, 2016

(86) PCT No.: PCT/JP2016/086615
§ 371 (c)(1),
(2) Date: Jul. 20, 2018

(87) PCT Pub. No.: WO2017/175419
PCT Pub. Date: Oct. 12, 2017

(65) Prior Publication Data
US 2019/0032950 A1   Jan. 31, 2019

(30) Foreign Application Priority Data
Apr. 5, 2016 (WO) .................. PCT/JP2016/061125

(51) Int. Cl.
*F24F 11/00* (2018.01)
*F24F 11/86* (2018.01)
(Continued)

(52) U.S. Cl.
CPC ............. *F24F 11/86* (2018.01); *F24D 3/14* (2013.01); *F24D 19/1084* (2013.01);
(Continued)

(58) Field of Classification Search
CPC ... F24D 3/12; F24D 3/14; F24D 3/145; F24D 3/146; F24D 3/16; F24D 13/024; G01J 5/0037
See application file for complete search history.

(56) References Cited

U.S. PATENT DOCUMENTS

| 5,384,716 A | 1/1995 | Araki et al. |
| 2010/0063636 A1 | 3/2010 | Matsumoto et al. |
| 2012/0012297 A1 | 1/2012 | Nakagawa et al. |

FOREIGN PATENT DOCUMENTS

| JP | 05-312381 A | 11/1993 |
| JP | 06-160507 A | 6/1994 |

(Continued)

OTHER PUBLICATIONS

Office Action dated Jun. 25, 2019 issued in corresponding JP patent application No. 2018-510225 (and English translation).
(Continued)

*Primary Examiner* — Jonathan Bradford
(74) *Attorney, Agent, or Firm* — Posz Law Group, PLC

(57) ABSTRACT

A controller converts a detection result of an infrared sensor into overall thermal image data representing a temperature distribution within an infrared detection range of the infrared sensor, calculates, based on the overall thermal image data, a floor area of an air-conditioned space, and obtains, based on the overall thermal image data, floor thermal image data including a plurality of element data items each including coordinates within the floor area and a floor temperature within the floor area associated with the coordinates. The controller determines the presence or absence of a floor heating device in the air-conditioned space. When the controller determines the presence of the floor heating device, the controller determines, based on data that is included in the floor thermal image data and corresponds to an installation region of the floor heating device, an operation state of the floor heating device.

21 Claims, 9 Drawing Sheets

(51) Int. Cl.
  *F24F 11/89* (2018.01)
  *F24F 11/79* (2018.01)
  *F24F 11/77* (2018.01)
  *F24F 11/30* (2018.01)
  *F24D 3/14* (2006.01)
  *F24D 19/10* (2006.01)
  *G01J 5/00* (2006.01)
  *F24F 110/10* (2018.01)

(52) U.S. Cl.
  CPC .............. *F24F 11/30* (2018.01); *F24F 11/77* (2018.01); *F24F 11/79* (2018.01); *F24F 11/89* (2018.01); *G01J 5/0037* (2013.01); *F24F 2110/10* (2018.01)

(56) References Cited

FOREIGN PATENT DOCUMENTS

| | | |
|---|---|---|
| JP | 07-293970 A | 11/1995 |
| JP | 11-153328 A | 6/1999 |
| JP | 2003-322388 A | 11/2003 |
| JP | 2004-286412 A | 10/2004 |
| JP | 2005-147614 A | 6/2005 |
| JP | 2010-091253 A | 4/2010 |
| JP | 2012-021735 A | 2/2012 |
| JP | 2015-052435 A | 3/2015 |

OTHER PUBLICATIONS

Office Action dated Jul. 4, 2019 issued in corresponding RU patent application No. 2018131226 (and English translation).
International Search Report dated Feb. 21, 2017 issued in corresponding international patent application No. PCT/JP2016/086615.

INDOOR UNIT OF AIR-CONDITIONING APPARATUS HAVING AN INFRARED SENSOR

CROSS REFERENCE TO RELATED APPLICATION

This application is a U.S. national stage application of International Application No. PCT/JP2016/086615, filed on Dec. 8, 2016, which claims priority to International Patent Application No. PCT/JP2016/061125 filed on Apr. 5, 2016, the contents of which are incorporated herein by reference.

TECHNICAL FIELD

The present invention relates to indoor units of air-conditioning apparatuses, and in particular, relates to an air-conditioning-apparatus indoor unit capable of determining an operation state of a floor heating device.

BACKGROUND

A recently developed system includes an air-conditioning apparatus and a floor heating device that operate in collaboration with each other (refer to, for example, Patent Literature 1). In the related-art system described in Patent Literature 1, both the floor heating device and an indoor unit of the air-conditioning apparatus are controlled on the basis of detection data from an infrared sensor.

PATENT LITERATURE

Patent Literature 1: Japanese Unexamined Patent Application Publication No. 11-153328

In the above-described related-art system, a controller obtains not only data on the air-conditioning apparatus but also data on the floor heating device to control various devices. In other words, the related-art system needs to be configured to communicate with the floor heating device, and its versatility decreases, accordingly.

SUMMARY

The present invention has been made to overcome the above-described disadvantages, and aims to provide an air-conditioning-apparatus indoor unit capable of achieving comfortable air-conditioning without communicating with a floor heating device.

An air-conditioning-apparatus indoor unit according to an embodiment of the present invention includes a casing, an infrared sensor disposed on the casing and configured to detect infrared radiation emitted to an air-conditioned space, and a controller to which the infrared sensor outputs a detection result. The controller is configured to convert the detection result of the infrared sensor into overall thermal image data representing a temperature distribution within an infrared detection range of the infrared sensor, calculate, on the basis of the overall thermal image data, a floor area of the air-conditioned space, and obtain, on the basis of the overall thermal image data, floor thermal image data including a plurality of element data items each including coordinates within the floor area and a floor temperature within the floor area associated with the coordinates. The controller is configured to determine, on the basis of the floor thermal image data, presence or absence of a floor heating device in the air-conditioned space. When the controller determines the presence of the floor heating device, the controller is configured to determine, on the basis of data that is included in the floor thermal image data and corresponds to an installation region of the floor heating device, an operation state of the floor heating device.

With the above-described configuration, the air-conditioning-apparatus indoor unit according to an embodiment of the present invention can achieve comfortable air-conditioning without communicating with the floor heating device.

DETAILED DESCRIPTION

Embodiments of an air-conditioning-apparatus indoor unit according to the present invention will be described below with reference to the drawings. The present invention is not limited to the following embodiments. Note that the relative sizes of components illustrated in the following figures including FIG. 1 may differ from actual relative sizes.

Embodiment 1

Figure 1:
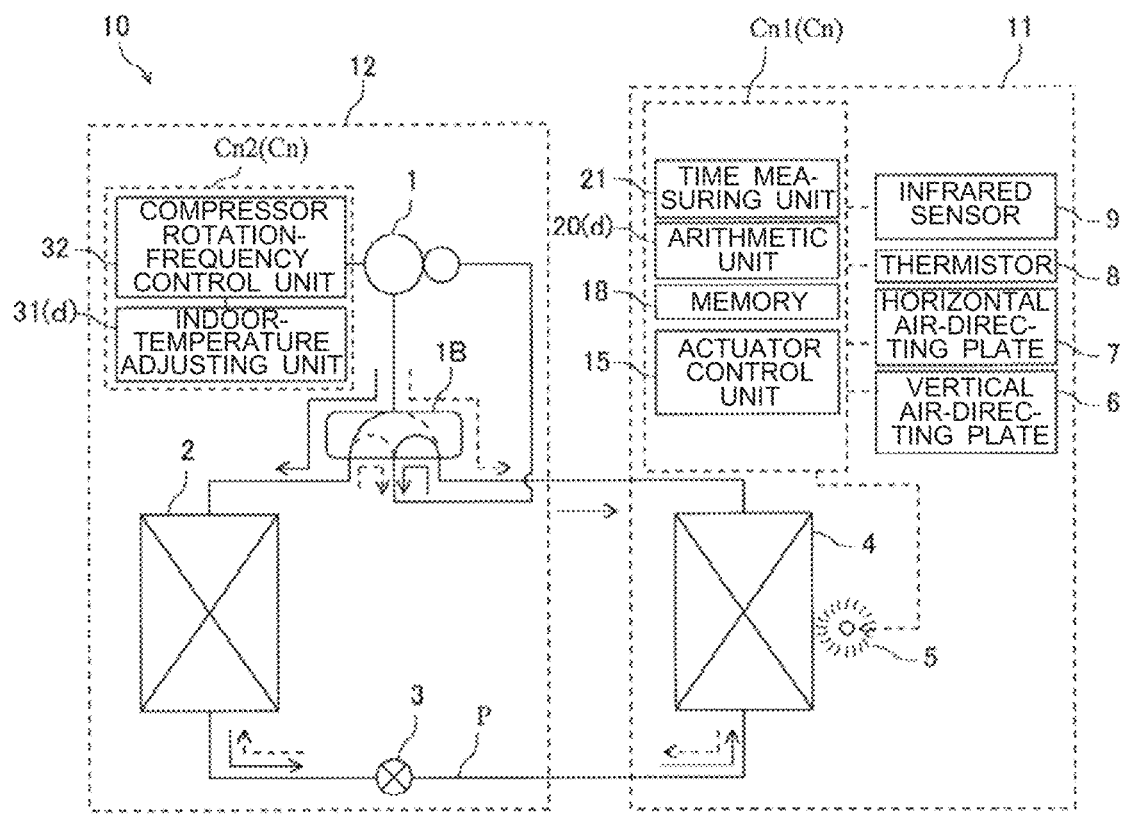
FIG. 1 is a schematic diagram illustrating an exemplary configuration of an air-conditioning apparatus including an indoor unit according to Embodiment 1 of the present invention.
Figure 2:
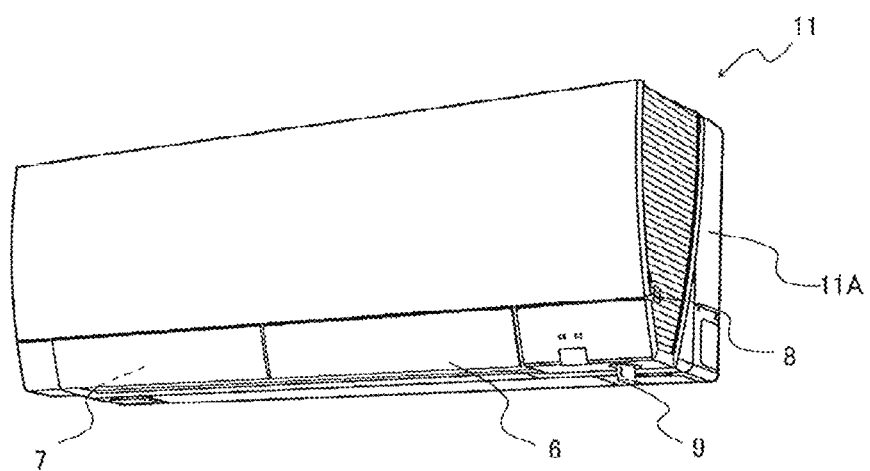
FIG. 2 is a perspective view of the indoor unit according to Embodiment 1 of the present invention.

FIG. 1 is a schematic diagram illustrating an exemplary configuration of an air-conditioning apparatus 10 including an indoor unit 11 according to Embodiment 1. FIG. 2 is a perspective view of the indoor unit 11 according to Embodiment 1. The configuration of the air-conditioning apparatus 10 will be described below with reference to FIGS. 1 and 2. The term "air-conditioned space" in Embodiment 1 refers to, for example, an indoor space in which the indoor unit 11 is installed.

[Description of Overall Configuration]

The air-conditioning apparatus 10 includes the indoor unit 11 and an outdoor unit 12. The indoor unit 11 and the outdoor unit 12 are connected by refrigerant pipes P.

The air-conditioning apparatus 10 includes a compressor 1, a four-way valve 1B, an outdoor heat exchanger 2, an expansion device 3, and an indoor heat exchanger 4. The compressor 1, the four-way valve 1B, the outdoor heat exchanger 2, the expansion device 3, and the indoor heat exchanger 4 are connected by the refrigerant pipes P.

The indoor unit 11 houses the indoor heat exchanger 4 and an air-sending fan 5. The outdoor unit 12 houses the compressor 1, the four-way valve 1B, the outdoor heat exchanger 2, and the expansion device 3. The expansion device 3 may be disposed outside the outdoor unit 12 and the indoor unit 11 or may be disposed in the indoor unit 11.

The air-conditioning apparatus 10 further includes the air-sending fan 5 provided to the indoor heat exchanger 4.

In addition, the air-conditioning apparatus 10 includes an infrared sensor 9 disposed on the indoor unit 11, a thermistor 8 disposed on the indoor unit 11, a horizontal air-directing plate 7 for adjusting the direction of air supplied from the indoor unit 11 to the air-conditioned space horizontally or in a right-left direction, and a vertical air-directing plate 6 for adjusting the direction of air supplied from the indoor unit 11 to the air-conditioned space vertically or in an up-down direction.

The air-conditioning apparatus 10 further includes a controller Cn. The controller Cn includes a controller Cn1 disposed in the indoor unit 11 and a controller Cn2 disposed in the outdoor unit 12.

The compressor 1 compresses and discharges refrigerant. The compressor 1 is connected at its discharge portion and its suction portion to the four-way valve 1B.

The four-way valve 1B is a refrigerant flow switching device. The four-way valve 1B is capable of switching between a first position to connect the discharge portion of the compressor 1 to the outdoor heat exchanger 2 and connect the suction portion of the compressor 1 to the indoor heat exchanger 4 and a second position to connect the discharge portion of the compressor 1 to the indoor heat exchanger 4 and connect the suction portion of the compressor 1 to the outdoor heat exchanger 2.

The outdoor heat exchanger 2 is connected at one end to the four-way valve 1B, and is connected at the other end to the expansion device 3. The outdoor heat exchanger 2 may be, for example, a finned-tube heat exchanger. The outdoor heat exchanger 2 acts as an evaporator when the air-conditioning apparatus 10 performs a heating operation, and acts as a condenser (radiator) when the air-conditioning apparatus 10 performs a cooling operation.

The expansion device 3 is connected at one end to the outdoor heat exchanger 2, and is connected at the other end to the indoor heat exchanger 4. The expansion device 3 may include a pressure reducing valve capable of adjusting the amount of expansion or may include a capillary tube.

The indoor heat exchanger 4 is connected at one end to the expansion device 3, and is connected at the other end to the four-way valve 1B. The indoor heat exchanger 4 may be, for example, a finned-tube heat exchanger. The indoor heat exchanger 4 acts as a condenser when the air-conditioning apparatus 10 performs the heating operation, and acts as an evaporator when the air-conditioning apparatus 10 performs the cooling operation.

The air-sending fan 5 is disposed in the indoor unit 11. Specifically, the indoor unit 11 includes a casing 11A, serving as a shell, and the air-sending fan 5 is disposed in the casing 11A. The casing 11A has an air inlet and an air outlet. The operation of the air-sending fan 5 causes air to be sucked into the casing 11A through the air inlet and causes air in the casing 11A to flow out of the casing 11A through the air outlet. Although not illustrated, an air-sending fan may be provided to the outdoor heat exchanger 2.

The infrared sensor 9, which is disposed on the casing 11A, detects infrared radiation emitted to the air-conditioned space. The infrared sensor 9 is disposed on lower part of the casing 11A. Specifically, the infrared sensor 9 protrudes from a lower surface of the casing 11A, and is located at a position close to one end of the casing 11A in the longitudinal direction of the casing 11A. The infrared sensor 9 is rotated by a stepping motor (not illustrated), and is capable of scanning infrared radiation in the air-conditioned space. The infrared sensor 9 outputs a detection result (infrared radiation temperature data) to the controller Cn.

The thermistor 8, which is disposed on the casing 11A, measures the temperature of the air-conditioned space. The thermistor 8 outputs a measurement result (indoor temperature data) to the controller Cn.

The horizontal air-directing plate 7 is disposed in the air outlet of the casing 11A. The horizontal air-directing plate 7 is, for example, a plate-shaped part. The horizontal air-directing plate 7 is fixed to a shaft (not illustrated). The movement of the shaft causes the horizontal air-directing plate 7 to rotate from side to side, or horizontally. Thus, the air-conditioning apparatus 10 can adjust the direction of air blown from the air outlet of the casing 11A horizontally.

The vertical air-directing plate 6 is disposed in the air outlet of the casing 11A, and is located adjacent to the horizontal air-directing plate 7. The vertical air-directing plate 6 is, for example, a plate-shaped part. The vertical air-directing plate 6 is fixed to a shaft (not illustrated). The movement of the shaft causes the vertical air-directing plate 6 to rotate up down, or vertically. Thus, the air-conditioning apparatus 10 can adjust the direction of air blown from the air outlet of the casing 11A vertically.

The controller Cn has at least three functions: a first function of calculating a floor area of the air-conditioned space; a second function of determining the presence or absence of a floor heating device installed in the air-conditioned space; and a third function of determining an operation state of the floor heating device. In Embodiment 1, the third function corresponds to a function of determining, on the basis of a detection result of the infrared sensor 9, whether the floor heating device installed under the floor of the air-conditioned space is in an on state. In other words, the operation state in Embodiment 1 corresponds to the on state or an off state of the floor heating device.

The first function of the controller Cn is achieved as follows, for example. The controller Cn converts a detection result of the infrared sensor 9 into overall thermal image data representing a temperature distribution within an infrared detection range of the infrared sensor 9, and calculates the floor area of the air-conditioned space on the basis of the overall thermal image data obtained by the conversion. The controller Cn obtains, on the basis of the overall thermal image data, floor thermal image data including a plurality of element data items each including coordinates within the floor area and a floor temperature within the floor area associated with the coordinates.

The second function of the controller Cn is achieved as follows, for example. The controller Cn determines, on the basis of the floor thermal image data, the presence or absence of a floor heating device in the air-conditioned space. Specifically, the floor thermal image data is composed of first temperature range element data items composed of the element data items each including floor temperature within a predetermined temperature range and second temperature range element data items composed of the element data items each including floor temperature outside the predetermined temperature range. When the presence of the floor heating device is determined (the second function), the area defined by the coordinates of the element data items constituting the first temperature range element data items is greater than or equal to a predetermined percentage p1 of an intended floor area. The percentage p1 corresponds to a first percentage in the present invention. For the intended floor area, for example, the whole of the floor area can be used. When the controller Cn determines the presence of the floor heating device, the controller Cn sets a flag indicating the presence of the floor heating device. In this case, the controller Cn has determined the presence of the floor heating device in the area defined by the coordinates of the element data items constituting the first temperature range element data items.

The third function of the controller Cn is achieved as follows, for example. When the controller Cn determines the presence of the floor heating device, the controller Cn determines, on the basis of data that is included in the floor thermal image data and corresponds to an installation region of the floor heating device, the operation state of the floor heating device. In Embodiment 1, the third function is achieved, for example, in a manner similar to the second function. Specifically, when the on state of the floor heating device is determined (the third function), the area defined by the coordinates of the element data items constituting the first temperature range element data items is greater than or equal to a predetermined percentage p2 of the intended floor area. The percentage p1 and the percentage p2 may be the same or different from each other.

The controller Cn includes the controller Cn1 disposed in the indoor unit 11 and the controller Cn2 disposed in the outdoor unit 12. The controller Cn1 and the controller Cn2 communicate with each other, and control various actuators for the compressor 1 and other devices in collaboration with each other.

The controller Cn1 includes an actuator control unit 15, a memory 18, an arithmetic unit 20, and a time measuring unit 21. The controller Cn2 includes a compressor rotation-frequency control unit 32 and an indoor-temperature adjusting unit 31. In the following description, the arithmetic unit 20 and the indoor-temperature adjusting unit 31 may also be collectively referred to as a determination unit d.

The actuator control unit 15 controls, for example, motors for the vertical air-directing plate 6, the horizontal air-directing plate 7, and the air-sending fan 5, on the basis of a determination result of the determination unit d, for example.

The memory 18 stores data including temperature data that is a measurement result of the thermistor 8, and the overall thermal image data based on a detection result of the infrared sensor 9. The overall thermal image data will be described below.

The overall thermal image data is obtained by scanning the air-conditioned space through the infrared sensor 9.

The overall thermal image data includes floor thermal image data and wall image data. When the scan range of the infrared sensor 9 includes no walls and only the floor is a target located within the scan range, the overall thermal image data will not include wall image data.

The overall thermal image data is composed of a plurality of element data items. The floor thermal image data is composed of a plurality of element data items, and the wall image data is also composed of a plurality of element data items.

Each element data item, or element data, is data corresponding to the least significant bit (LSB), which is a minimum unit of thermal data obtained by the infrared sensor 9. The element data includes coordinate data (x, y) and temperature data (T) associated with the coordinate data. The element data is associated with the coordinate data representing a first coordinate x in a first direction and a second coordinate y in a second direction and the temperature data T representing a floor temperature at a position defined by the first coordinate x and the second coordinate y. In other words, the element data can be expressed as (x, y, T).

The arithmetic unit 20 has the above-described first, second, and third functions.

The time measuring unit 21 has a function of measuring various time lengths. For example, the time measuring unit 21 measures time that has elapsed since activation of the air-conditioning apparatus 10.

The indoor-temperature adjusting unit 31 gives an instruction to the compressor rotation-frequency control unit 32 to control the compressor 1 on the basis of a determination result of the arithmetic unit 20 and a detection result of the infrared sensor 9. For example, when the arithmetic unit 20 determines that the floor heating device is on, the indoor-temperature adjusting unit 31 gives an instruction to the compressor rotation-frequency control unit 32 to increase, reduce, or maintain the rotation frequency of the compressor 1.

[Description of Refrigerant Flow]

In the heating operation, the refrigerant discharged from the compressor 1 is supplied to the indoor heat exchanger 4 through the four-way valve 1B. In other words, the indoor heat exchanger 4 acts as a condenser. The refrigerant supplied to the indoor heat exchanger 4 exchanges heat with air supplied by the air-sending fan 5, and thus condenses and liquifies. The refrigerant leaving the indoor heat exchanger 4 is reduced in pressure by the expansion device 3, so that the refrigerant turns into low-temperature, low-pressure, two-phase gas-liquid refrigerant. The refrigerant leaving the expansion device 3 is supplied to the outdoor heat exchanger 2. In other words, the outdoor heat exchanger 2 acts as an evaporator. The refrigerant supplied to the outdoor heat exchanger 2 evaporates and gasifies. The refrigerant leaving the outdoor heat exchanger 2 passes through the four-way valve 1B, and is returned to the suction portion of the compressor 1.

In the cooling operation, the refrigerant flows in a direction opposite to that in the heating operation.

[Infrared Sensor 9]

Figure 3:
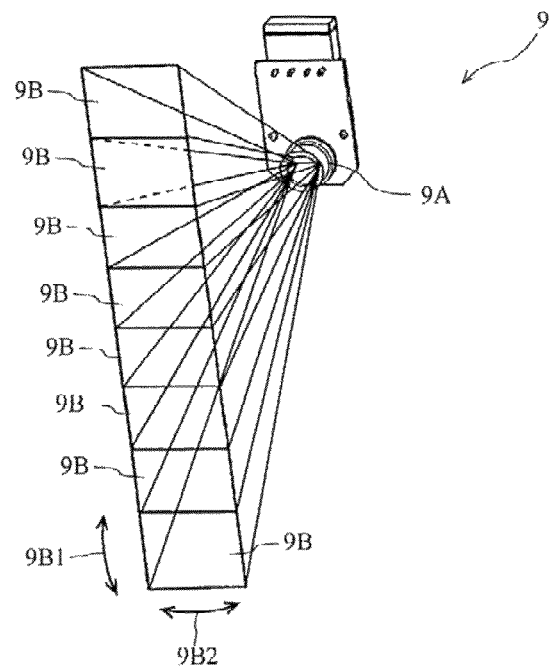
FIG. 3 is a diagram explaining an infrared sensor of the indoor unit according to Embodiment 1 of the present invention.

FIG. 3 is a diagram explaining the infrared sensor 9 of the indoor unit 11 according to Embodiment 1.

The infrared sensor 9 is mounted on the casing 11A such that the infrared sensor 9 faces downward (for example, at a depression angle of approximately 24.5 degrees) to the floor.

As illustrated in FIG. 3, the infrared sensor 9 includes a cylindrical part 9A made of metal and eight light-receiving elements (not illustrated) arranged in the cylindrical part. The eight light-receiving elements are vertically arranged in a straight line. The cylindrical part 9A has an end with a lens window (not illustrated) through which infrared radiation can enter and reach the light-receiving elements. A light-distribution view angle 9B of each light-receiving element is defined by a vertical light-distribution view angle 9B1 of 7 degrees and a horizontal light-distribution view angle 9B2 of 8 degrees.

Although the above-described light-distribution view angle 9B of each light-receiving element extends 7 degrees vertically and 8 degrees horizontally, the view angles are not limited to 7 degrees in the vertical direction and 8 degrees in the horizontal direction. The number of light-receiving elements varies depending on the light-distribution view angle 9B of each light-receiving element. For example, it is only required that the product of the vertical light-distribution view angle 9B1 of each light-receiving element and the number of light-receiving elements is constant.

The infrared sensor 9 can be rotated from side to side within a predetermined angle range by the action of, for example, the stepping motor (not illustrated). Specifically, the infrared sensor 9 can scan, for example, the floor and the walls within a predetermined range. In this case, each time the stepping motor rotates by 1.6 degrees, the stepping motor stops rotating for a predetermined time (0.1 to 0.2 seconds), and data for thermal image data on the floor and the walls is obtained from the light-receiving elements of the infrared sensor 9.

The operation of rotating the stepping motor by 1.6 degrees and the operation of obtaining thermal image data from the light-receiving elements are repeated, so that the infrared sensor 9 can obtain data for overall thermal image data. When an upper limit and a lower limit of the rotation angle of the stepping motor are set, the stepping motor operates as follows. For example, the stepping motor (infrared sensor 9) starts to rotate from the lower limit of the rotation angle. The rotation angle of the stepping motor (infrared sensor 9) increases to reach the upper limit, and then decreases from the upper limit to the lower limit.

The infrared sensor 9 combines data for thermal image data items obtained for respective rotation angle ranges of the stepping motor into data for overall thermal image data. In Embodiment 1, the stepping motor has 94 rotation angle ranges. In other words, the angle of rotation of the infrared sensor 9 is approximately 150.4 degrees. The infrared sensor 9 obtains 94 thermal image data items by scanning an area corresponding to the range from the lower limit to the upper limit of the rotation angle of the stepping motor. The controller Cn generates overall thermal image data on the basis of the 94 thermal image data items.

Figure 4:
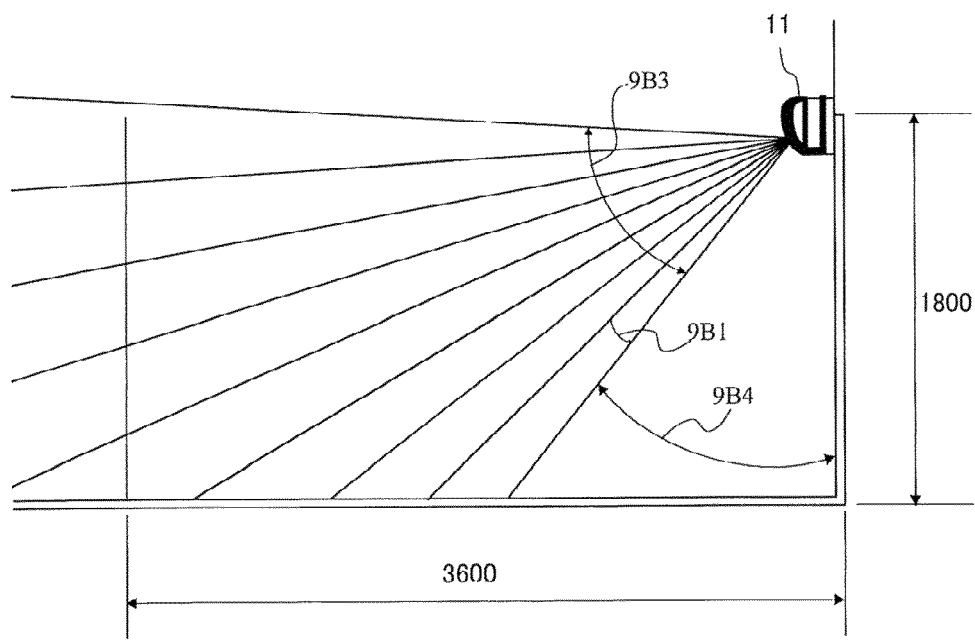
FIG. 4 is a diagram illustrating vertical light-distribution view angles of the infrared sensor of the indoor unit according to Embodiment 1 of the present invention.

FIG. 4 is a diagram illustrating vertical light-distribution view angles of the infrared sensor 9 of the indoor unit 11 according to Embodiment 1. FIG. 4 illustrates the vertical light-distribution view angles under conditions where the indoor unit 11 is installed at a level of 1,800 mm from the floor of the indoor space. The vertical light-distribution view angle 9B1 of one light-receiving element is 7 degrees. FIG. 4 further illustrates an overall light-distribution view angle 9B3 corresponding to the vertical light-distribution view angles of all of the light-receiving elements. An angle range 9B4 is outside the overall light-distribution view angle 9B3 of the infrared sensor 9. The angle range 9B4 is an angle formed by a reference wall, on which the indoor unit 11 is mounted, and a lower limit of the overall light-distribution view angle 9B3.

When the depression angle of the infrared sensor 9 is 0 degrees, an equation is satisfied that the angle range 9B4=90 degrees−4 (the number of light-receiving elements whose vertical light-distribution view angle 9B1 is less than 0 degrees when the horizontal direction is 0 degrees)×7 degrees (vertical light-distribution view angle of one light-receiving element)=62 degrees. As the infrared sensor 9 in Embodiment 1 is at a depression angle of 24.5 degrees, an equation is satisfied that the angle range 9B4=62 degrees−24.5 degrees=37.5 degrees.

[First Function]

Figure 5A:
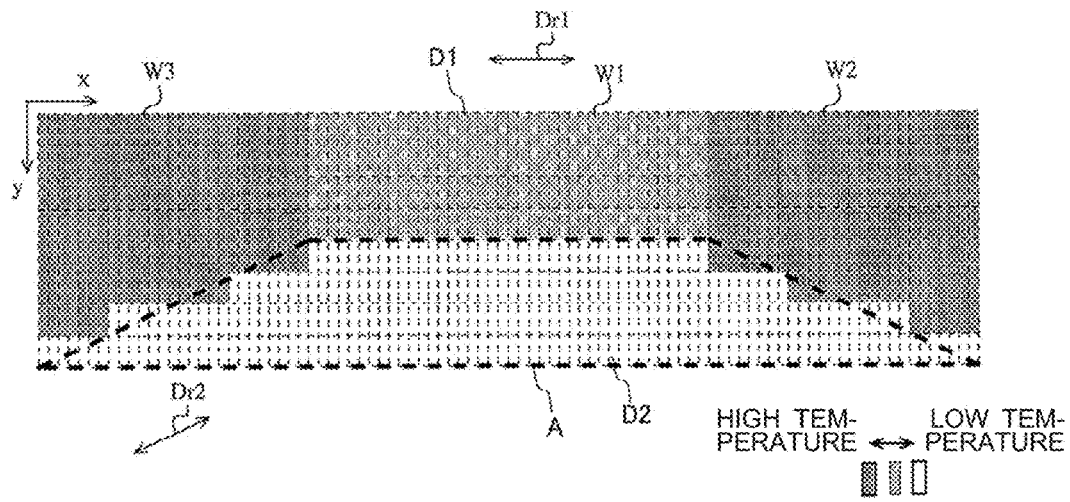
FIG. 5A illustrates overall thermal image data including data corresponding to a floor and walls of an air-conditioned space (indoor space).
Figure 5B:
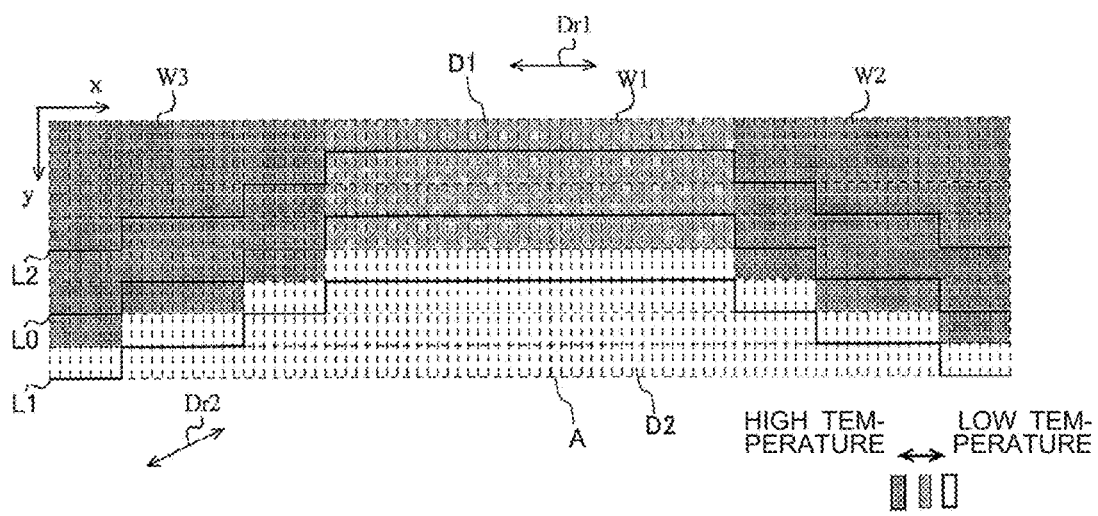
FIG. 5B is a diagram explaining a reference line, a partition line, and another partition line.
Figure 5C:
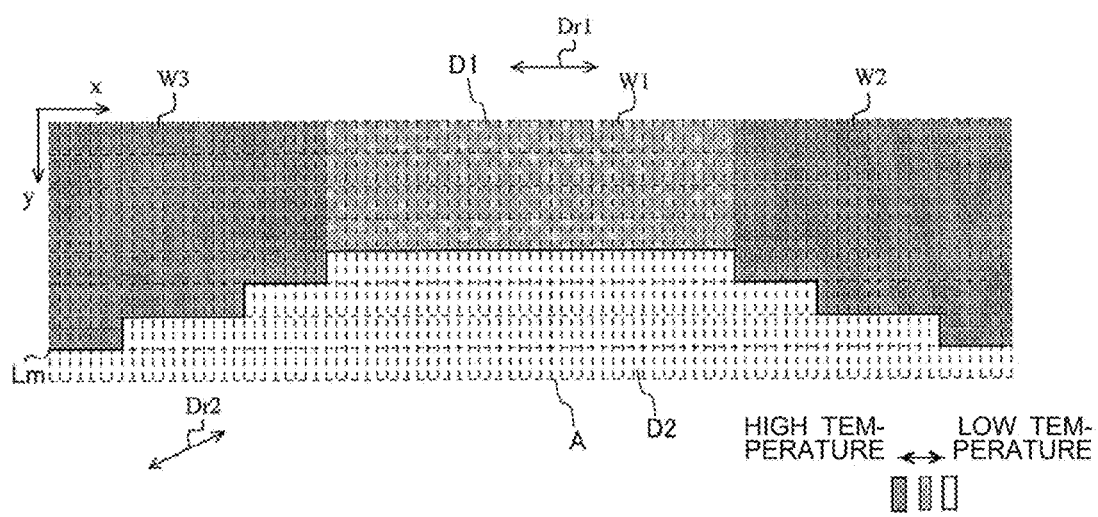
FIG. 5C is a diagram explaining a boundary line obtained on the basis of temperature variations between the partition lines.

FIG. 5A illustrates overall thermal image data including data corresponding to a floor A, a wall W1, a wall W2, and a wall W3 of the air-conditioned space (indoor space). FIG. 5B is a diagram explaining a reference line L0, a partition line L2, and a partition line L1. FIG. 5C is a diagram explaining a boundary line Lm obtained on the basis of temperature variations between the partition lines L2 and L1. The floor A is represented by a dashed-lined trapezoidal portion in FIG. 5A. The floor A extends in a first direction Dr1 (right-left direction) and a second direction Dr2 (depth direction). The floor A, the first direction Dr1, and the second direction Dr2 are concepts in a real space. The first direction Dr1 and the second direction Dr2 are parallel to the horizontal direction.

Figure 5D:
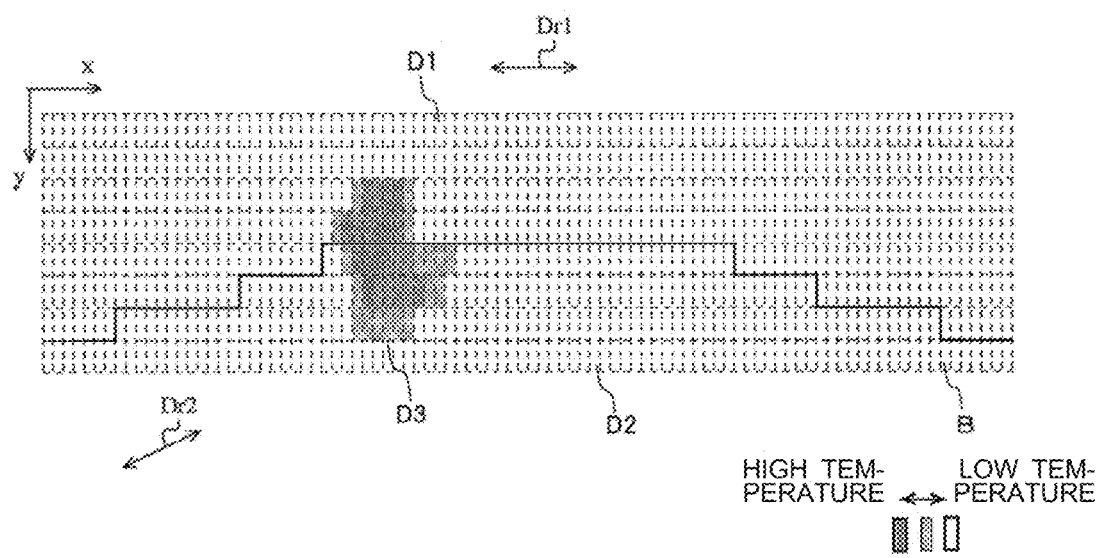
FIG. 5D illustrates overall thermal image data including data corresponding to a user present in the air-conditioned space (indoor space).

FIG. 5D illustrates overall thermal image data including data corresponding to a user present in the air-conditioned space (indoor space). As illustrated in FIG. 5D, the floor A represents as a floor area B on overall thermal image data D1. On the overall thermal image data, the first direction Dr1 in the real space corresponds to the direction of the first coordinate x, and the second direction Dr2 in the real space corresponds to the direction of the second coordinate y.

As illustrated in FIG. 5D, the overall thermal image data represents an increase in temperature in a region occupied by the user in the air-conditioned space. In FIG. 5D, data corresponding to a certain range of the first coordinate values and a certain range of the second coordinate values represents an increase in temperature. In FIG. 5D, the data corresponding to the certain ranges of the first and second coordinate values represents as thermal image data D3.

The controller Cn can calculate an area corresponding to the floor A using the obtained overall thermal image data D1 (the first function). In other words, the controller Cn can calculate the floor area B on the basis of the overall thermal image data D1. For such a calculation unit, a known unit (refer to Japanese Unexamined Patent Application Publication No. 2010-91253, for example) can be used.

The controller Cn can perform the first function at predetermined time. Specifically, the controller Cn may perform the first function before the compressor 1 is activated or may perform the first function when the controller Cn receives operation start data from an operation unit (remote control) that transmits operation information.

For example, the controller Cn can obtain the floor area B of the air-conditioned space on the basis of temperature variations that is to be generated along a boundary portion between the floor A and the walls of the air-conditioned space.

As illustrated in FIG. 5B, the controller Cn has data on the reference line L0 to be used to separate the floor A from the surfaces of the walls W1, W2, and W3. The data on the reference line L0 is obtained on the basis of, for example, data on a capacity zone of the air-conditioning apparatus and installation position data about the indoor unit 11 set through, for example, the remote control. As illustrated in FIG. 5B, the reference line L0 does not coincide with the boundary between the floor A and the surfaces of the walls W1, W2, and W3.

The controller Cn can obtain the partition line L1 and the partition line L2, each of which is a predetermined number of pixels away from the reference line L0. In this case, the predetermined number of pixels is, for example, two. The y coordinate values of the partition line L1, the reference line L0, and the partition line L2 are in descending order. In other words, the reference line L0 is located between the partition line L1 and the partition line L2.

The controller Cn obtains data on the boundary line Lm that separates the floor A from the surfaces of the walls W1, W2, and W3 on the basis of data that is included in the overall thermal image data D1 and corresponds to a region between the partition lines L1 and L2. In a case where temperature variations in the y direction are large in pixels, the controller Cn calculates the coordinate values of the pixels as the coordinate values of the boundary line Lm. For calculation of temperature variations in the y direction, absolute values in the overall thermal image data D1 may be used or derivatives in the y direction may be used.

How to separate the floor A from the surfaces of the walls W1, W2, and W3 has been described above. The controller Cn can obtain a region corresponding to the surface of the wall W1 and a region corresponding to the surface of the wall W2 in the same manner.

The controller Cn can obtain the floor area B corresponding to the floor A on the basis of the data on the boundary line Lm. The controller Cn calculates, as the floor area B, a region having y coordinate values greater than those of the boundary line Lm in the overall coordinate range of the overall thermal image data D1. In other words, in FIG. 5C, a region located below the boundary line Lm in the overall thermal image data D1 corresponds to floor thermal image data D2.

[Second Function]

Figure 6:
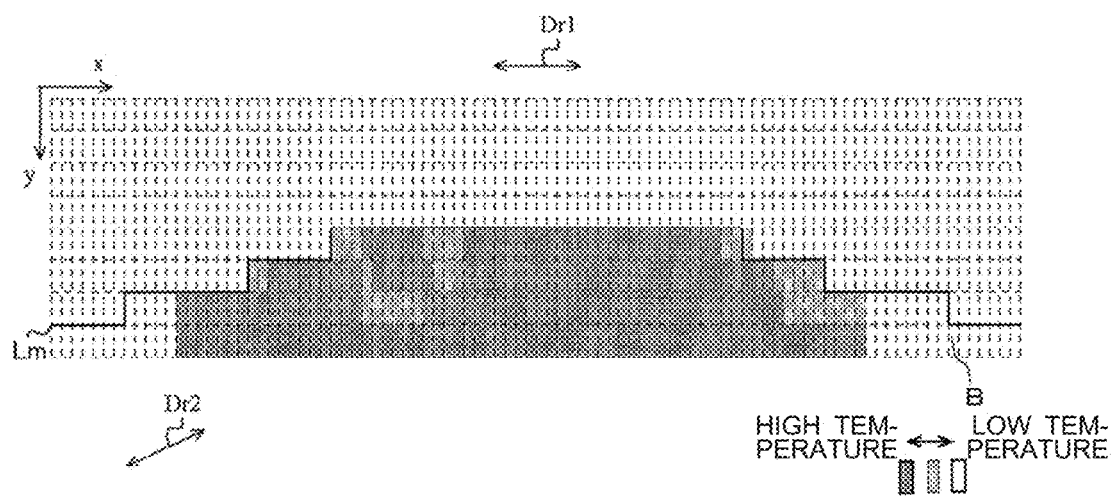
FIG. 6 illustrates overall thermal image data in an on state of a floor heating device.

FIG. 6 illustrates overall thermal image data in the on state of the floor heating device. FIG. 6 illustrates an exemplary state of the floor heating device operating in an operation mode for heating the entire floor. The second function will be described below with reference to FIG. 6.

The second function is a function of determining, on the basis of floor thermal image data, the presence or absence of a floor heating device in an air-conditioned space. The controller Cn determines whether the number of element data items each including a floor temperature within the predetermined temperature range is greater than or equal to the predetermined percentage p1 of the number of element data items corresponding to an intended floor area. When the number of element data items is greater than or equal to the predetermined percentage p1, the controller Cn determines the presence of the floor heating device. For example, the controller Cn sets the intended floor area to the whole of the floor area B. In FIG. 6, dark portions each represent a floor temperature within the predetermined temperature range. In FIG. 6, temperatures, specified by temperature data, associated with 70% or more of the element data items corresponding to the floor area B are within the predetermined temperature range. For example, when the percentage p1 is 60%, the controller Cn determines the presence of the floor heating device.

[Third Function]

Figure 7:
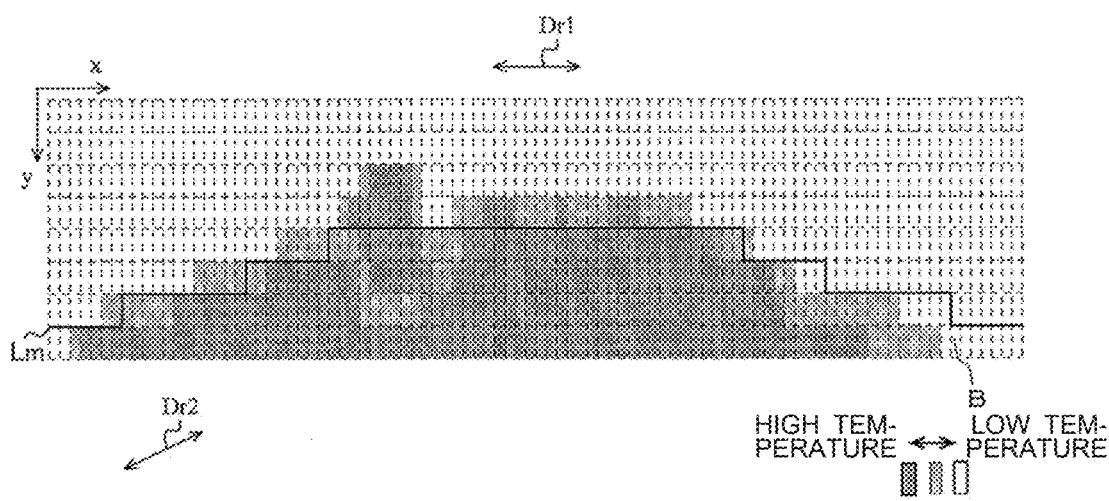
FIG. 7 illustrates overall thermal image data in the on state of the floor heating device in an operation mode for heating the entire floor.

FIG. 7 illustrates overall thermal image data D1 in the on state of the floor heating device in the operation mode for heating the entire floor A.

Figure 8:
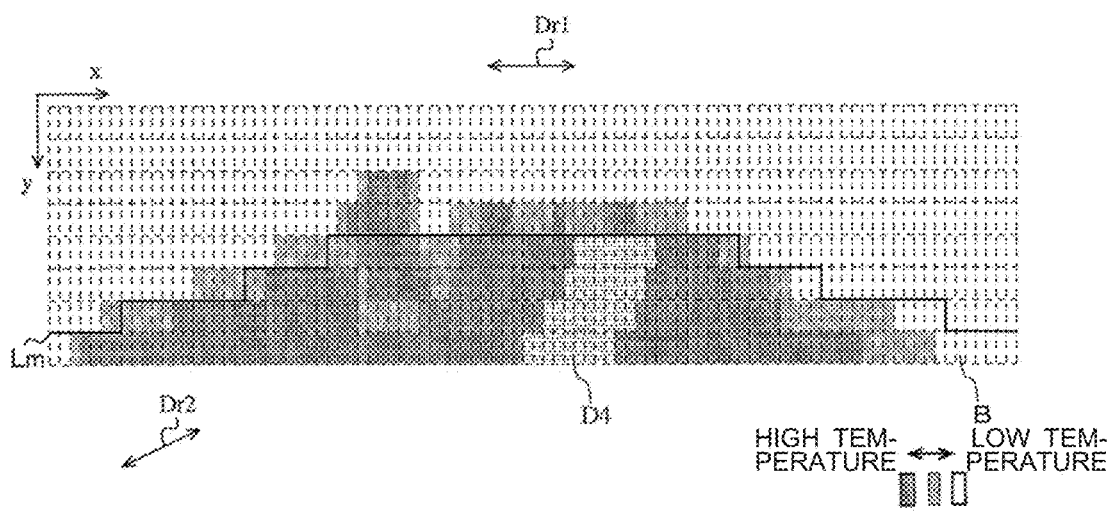
FIG. 8 illustrates overall thermal image data in the on state of the floor heating device under conditions where a piece of furniture is placed on the floor of the air-conditioned space (indoor space).

FIG. 8 illustrates overall thermal image data D1 in the on state of the floor heating device under conditions where a piece of furniture is placed on the floor A of the air-conditioned space (indoor space).

FIG. 7 illustrates a state in which the floor heating device is on and the whole of the floor A (the entire floor area B) is heated.

However, even when the whole of the floor A is heated, a piece of furniture, such as a sofa and a table, in the air-conditioned space will block part of infrared radiation emitted from the floor A. Consequently, thermal image data D4 corresponding to a certain range of the first coordinate values and a certain range of the second coordinate values represents a lower temperature than temperatures represented by data corresponding to regions surrounding the range corresponding to the thermal image data D4. In FIG. 8, the data corresponding to the certain range of the first coordinate values and the certain range of the second coordinate values is illustrated as the thermal image data D4. Consequently, the thermal image data D4 divides thermal image data representing high temperatures. For example, when the operation state of the floor heating device is determined only on the basis of a temperature distribution in the first direction (direction of the first coordinate x) or a temperature distribution in the second direction (direction of the second coordinate y), the accuracy of determination of the operation state of the floor heating device is reduced by the division of the thermal image data. In other words, although the floor heating device is actually on, a region representing high temperatures is divided into short segments, and thus the floor heating device may be determined to be off. The indoor unit 11 according to Embodiment 1 can avoid such an erroneous determination.

The controller Cn has a function of obtaining overall thermal image data D1 representing a temperature distribution in the infrared detection range of the infrared sensor 9 on the basis of a detection result of the infrared sensor 9. Furthermore, the controller Cn determines, on the basis of floor thermal image data D2 that is included in the overall thermal image data D1 and represents a temperature distribution in the first direction Dr1 of the floor A and the second direction Dr2 intersecting the first direction Dr1, whether the heating device is in the on state.

Specifically, when element data items each representing a temperature higher than a first temperature threshold account for a predetermined percentage p2 or more of a predetermined number of element data items, the controller Cn determines that the floor heating device is on. As described above, the determination unit d of the controller Cn uses not a temperature distribution in the first direction Dr1 (direction of the first coordinate x) or the second direction Dr2 (direction of the second coordinate y) but a temperature distribution in both the first direction Dr1 (direction of the first coordinate x) and the second direction Dr2 (direction of the second coordinate y) to determine the operation state of the floor heating device. Consequently, the accuracy of determination of the operation state of the floor heating device can be increased. The effect of the increase in determination accuracy is great particularly in a case where a piece of furniture is placed in the air-conditioned space as illustrated in FIG. 8.

In the case illustrated in FIG. 7, the controller Cn determines the on state of the floor heating device in the following manner.

In the case where element data items each representing a temperature higher than the first temperature threshold (e.g., 25 degrees C.) account for the percentage p2 (e.g., 60%) or more of the total number of element data items, the controller Cn determines that the floor heating device is on.

In FIG. 7, the total number of element data items is 270. The number of element data items each representing a temperature higher than the first temperature threshold is 193. Consequently, an equation is satisfied that 193/270=approximately 71%, which exceeds the percentage p2. Thus, the determination unit d of the controller Cn determines that the floor heating device is on.

In the case illustrated in FIG. 8, the controller Cn determines the on state of the floor heating device in the following manner.

In FIG. 8, the total number of element data items is 270, which is the same as that in FIG. 7. In this case, the number of element data items each representing a temperature higher than the first temperature threshold is 163, which is lower than that in FIG. 7 because of the existence of the piece of furniture. However, an equation is satisfied that 163/270=approximately 60.3%, which exceeds the percentage p2. Thus, the determination unit d of the controller Cn can determine that the floor heating device is on. In other words, even when the thermal image data D4 divides the thermal image data representing high temperatures, the controller Cn can determine that the floor heating device is on.

Figure 9:
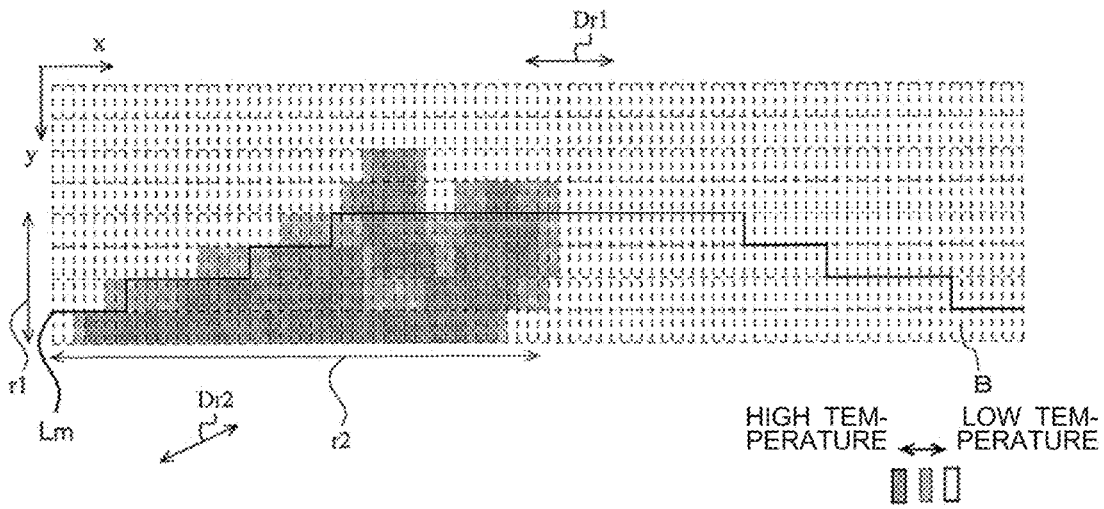
FIG. 9 illustrates overall thermal image data in the on state of the floor heating device in an operation mode for heating half of the floor.

FIG. 9 illustrates overall thermal image data D1 in the on state of the floor heating device in an operation mode for heating half of the entire floor A.

Some floor heating devices have a mode for heating half of the entire floor A and another mode for heating ¾ of the floor A in addition to the mode for heating the whole of the floor A. In such a mode, the controller Cn can accurately determine whether the floor heating device is on.

In a case where element data items each representing a temperature higher than the first temperature threshold (e.g., 25 degrees C.) account for the percentage p2 (e.g., 60%) or more of element data items belonging to a first range of consecutive first coordinate values x and a second range of consecutive second coordinate values y, the controller Cn determines that the heating device is on.

With such a configuration, the determination unit d of the indoor unit 11 can determine the on state of the floor heating device even in the mode for heating, for example, half of the entire floor A. In the above description, the percentage p2 is equal to the percentage p1. The percentage p2 may differ from the percentage p1.

In the case illustrated in FIG. 9, the controller Cn determines the on state of the floor heating device in the following manner.

In FIG. 9, the number of element data items belonging to a first range r1 of consecutive first coordinate values x and a second range r2 of consecutive second coordinate values y is 135. In the controller Cn, the first range r1 and the second range r2 are set for the mode for heating half of the floor A. The controller Cn has a variety of first ranges r1 and a variety of second ranges r2 for other modes of the floor heating device.

In this case, the number of element data items each representing a temperature higher than the first temperature threshold is 90, and an equation is satisfied that $90/135$=approximately 66.6%, which exceeds the percentage p2. Thus, the controller Cn can determine that the floor heating device is on.

In the above description with reference to FIGS. 7 to 9, the controller Cn uses the first temperature threshold. Any other threshold may be used. For example, a second temperature threshold (e.g., 35 degrees C.) greater than the first temperature threshold may be set in addition to the first temperature threshold in the controller Cn. Specifically, the determination unit d of the controller Cn determines the on state of the heating device in a case where element data items each representing a temperature higher than the first temperature threshold and lower than the second temperature threshold higher than the first temperature threshold account for the percentage p2 (e.g., 60%) or more of the total number of element data items. Floor heating devices achieve temperatures typically ranging from approximately 25 degrees C. to approximately 35 degrees C. Setting not only a lower limit (first temperature threshold) but also an upper limit (second temperature threshold) achieves a further increase in accuracy of determination of the operation state of the floor heating device.

As regards how to determine the first and second temperature thresholds, although 25 degrees C. and 35 degrees C. are used as examples in the above description, any other values may be used. The first and second temperature thresholds may be determined on the basis of a temperature measured by the thermistor 8. Specifically, the controller Cn may set the first temperature threshold to a temperature higher than the temperature measured by the thermistor 8 and set the second temperature threshold to a temperature higher than the first temperature threshold.

For the third function, the controller Cn determines the operation state of the floor heating device. Control to be performed in a case where the controller Cn determines the on state of the floor heating device and control to be performed in a case where the controller Cn determines the off state of the floor heating device will be described below. In the case where the controller Cn determines the off state of the floor heating device, the controller Cn performs control based on the difference between a set temperature and an indoor temperature (NO in step S1 in FIG. 10) or control based on the difference between the indoor temperature and a floor temperature (NO in step S11 in FIG. 12). For example, when the floor temperature is significantly lower than the indoor temperature, the controller Cn increases the rotation frequency of the compressor 1. For example, when the floor temperature is significantly lower than a set temperature of the indoor space, the controller Cn increases the rotation frequency of the compressor 1.

Figure 12:
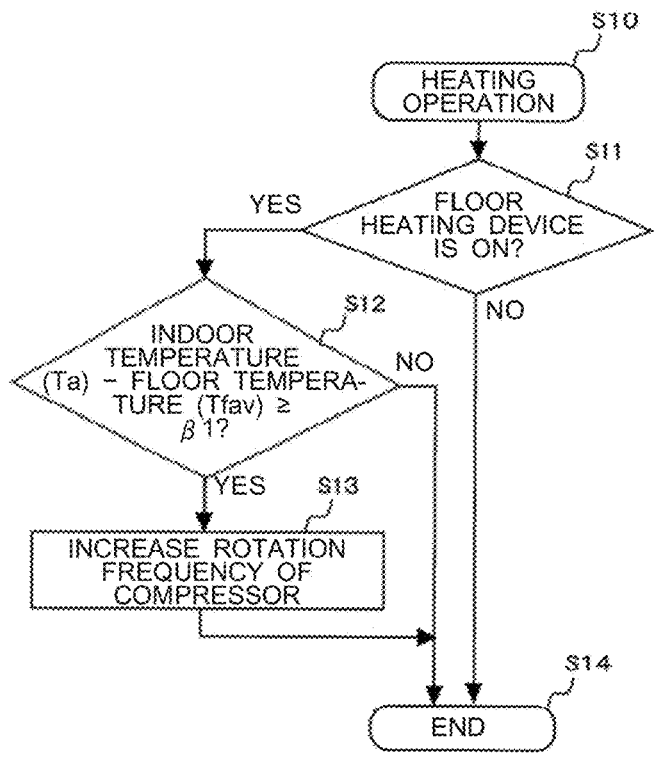
FIG. 12 illustrates a control flowchart 2 for the indoor unit according to Embodiment 1 of the present invention.

When the controller Cn determines that the floor heating device is on, the controller Cn performs control based on a sensible temperature in addition to the difference between the set temperature and the indoor temperature (YES in step S1 in FIG. 10) or control based on the difference between the indoor temperature and the floor temperature (YES in step S11 in FIG. 12). This operation eliminates or reduces a likelihood that a user may feel a current of cold air.

[Control Flowchart 1]

Figure 10:
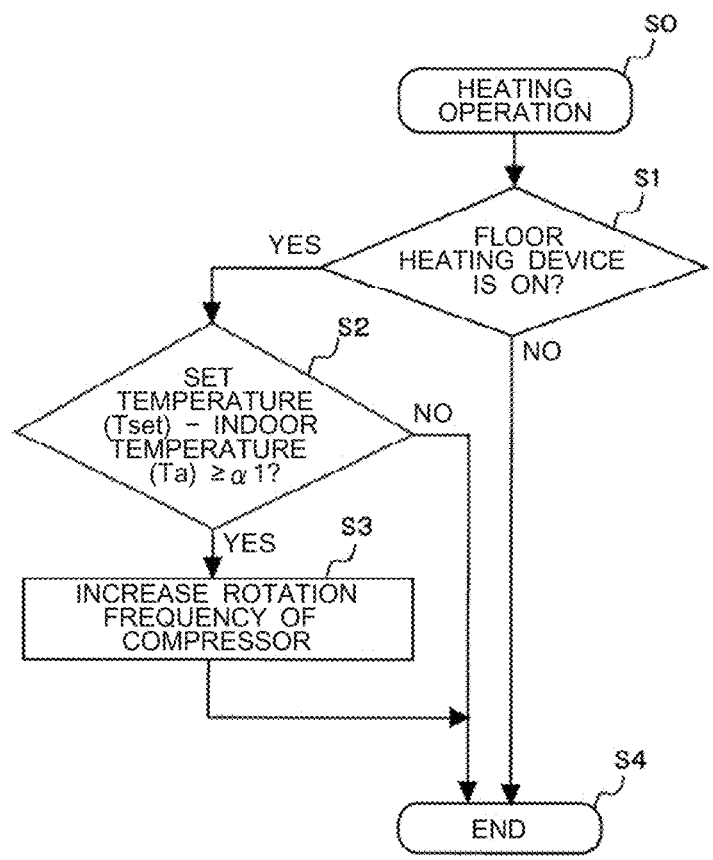
FIG. 10 illustrates a control flowchart 1 for the indoor unit according to Embodiment 1 of the present invention.

FIG. 10 illustrates a control flowchart 1 for the indoor unit 11 according to Embodiment 1.

When the controller Cn determines, during the heating operation, that the floor heating device is on, the controller Cn adjusts the rotation frequency of the compressor 1 on the basis of a set temperature and a sensible temperature obtained by subtracting a temperature correction value (correction value Co1, which will be described later) from a temperature measured by a temperature sensor (thermistor 8). Furthermore, when the difference between the set temperature and the sensible temperature is greater than or equal to a predetermined value, the controller Cn increases the rotation frequency of the compressor 1. Such a configuration will be described below.

(Step S0)

The controller Cn performs the heating operation. In step S0, the floor area B has been obtained, and the presence of a floor heating device has been determined.

(Step S1)

The controller Cn determines whether the floor heating device is on.

(1) When the controller Cn determines that the floor heating device is off, the process proceeds to step S4.

(2) When the controller Cn determines that the floor heating device is on, the process proceeds to step S2. Proceeding to step S2 performs control for maintaining the rotation frequency of the compressor 1 (step S4) or increasing the rotation frequency (step S3). The reason for performing such control is that an indoor temperature corrected on the basis of a detection result of the infrared sensor 9 in the on state of the floor heating device may cause the user to feel a current of cold air. Specifically, when the floor heating device is operating under conditions where an actual indoor temperature is not so high, the infrared sensor 9 is to correct the indoor temperature on the basis of the temperature of the floor heated by the floor heating device. In other words, a high sensible temperature may be determined, causing control for reducing the rotation frequency of the compressor 1. When control for reducing the rotation frequency of the compressor 1 is performed under conditions where an actual indoor temperature is not so high, the user may feel a current of cold air. To avoid such a situation, control for reducing the rotation frequency of the compressor 1 is not performed. Instead, control for maintaining or increasing the rotation frequency of the compressor 1 is performed.

(Step S2)

The controller Cn determines whether a value obtained by subtracting the temperature measured by the thermistor 8 from a set temperature of the air-conditioned space set through, for example, the remote control, is greater than or equal to α1.

When the value is greater than or equal to α1, the process proceeds to step S3.

When the value is not greater than or equal to α1, the process proceeds to step S4.

(Step S3)

The controller Cn increases the rotation frequency of the compressor 1.

An increase may be a constant or may vary depending on the difference between the set temperature and the indoor temperature. In other words, an increase in rotation frequency of the compressor 1 may be increased as the difference increases.

The controller Cn makes a determination on the basis of the following expression in step S2.

Set temperature $T$set−Indoor temperature $Ta ≥ α1$     (Expression 1)

In this expression, an equation is satisfied that $α1 = C1$ (constant)+correction value Co1.

The correction value Co1 is a positive value and is not determined on the basis of the floor temperature.

Expression 1 described above can be rewritten as follows.

Set temperature $T$set−(Indoor temperature $Ta$+Correction value $Co1$) ≥ $C1$ (constant)

In this expression, the sum of the indoor temperature Ta and the correction value Co1 is a value corresponding to the sensible temperature.

The reason why the correction value Co1 is used is to avoid an erroneous determination that the indoor space is heated in the on state of the floor heating device. Specifically, when the infrared sensor 9 scans the indoor space in the on state of the floor heating device, the floor temperature is high, so that the controller Cn may erroneously determine that the indoor space is heated. In such a case, although the indoor space is not sufficiently heated and the rotation frequency of the compressor 1 should not be reduced, the controller Cn may perform control for reducing the rotation frequency of the compressor 1.

For this reason, when the controller Cn determines that the floor heating device is on (step S1 to step S2), the controller Cn of the indoor unit 11 according to Embodiment 1 uses Expression 1 described above. When this expression is satisfied, the controller Cn increases the rotation frequency of the compressor 1 (step S3). When the expression is not satisfied, the controller Cn maintains the rotation frequency of the compressor 1 (step S4 in FIG. 10). An increase in rotation frequency of the compressor 1 may be set greater as the difference between the set temperature and the sensible temperature increases.

[Modification of Control Flowchart 1]

Figure 11:
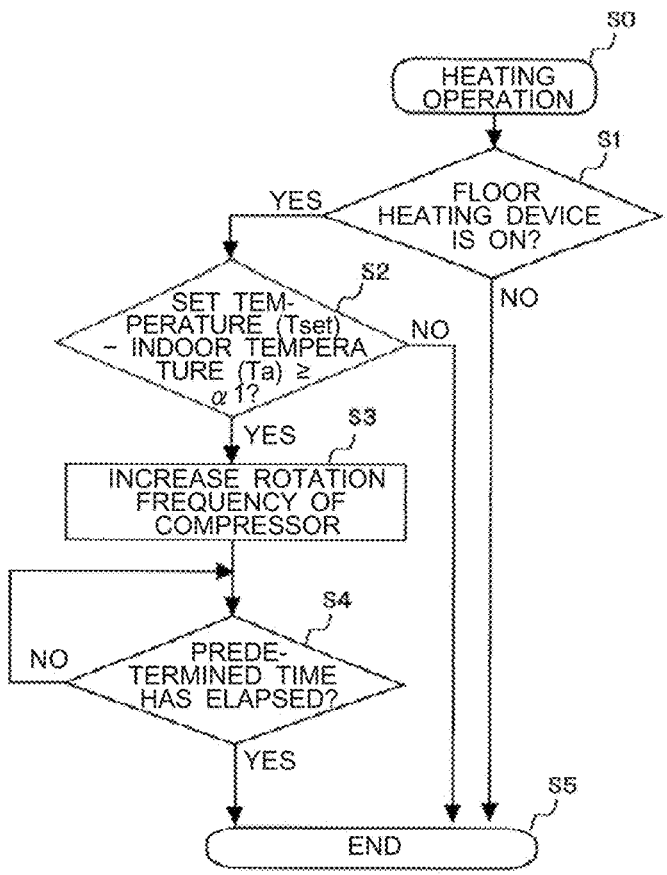
FIG. 11 illustrates a modification of the control flowchart 1 illustrated in FIG. 10.

FIG. 11 illustrates a modification of the control flowchart 1 of FIG. 10.

A long heating operation raises warm air from below in the air-conditioned space, so that the entire air-conditioned space becomes heated. Consequently, the process of the control flowchart 1 of FIG. 10 is preferable to be performed temporarily. A control flowchart 1 according to the modification illustrated in FIG. 11 includes step S4. In step S4, the controller Cn determines whether a predetermined time has elapsed since the increase in the rotation frequency of the compressor 1 in step S3. Step S4 is repeated until the predetermined time elapses. When the predetermined time has elapsed, the process proceeds to step S5, and the control process is terminated. The operations in steps S1, S2, S3, and S5 in FIG. 11 are the same as those in steps S1, S2, S3, and S4 in FIG. 10.

When the process proceeds from step S4 to step S5, the controller Cn may reduce the rotation frequency of the compressor 1. For example, when the process proceeds from step S4 to step S5, the controller Cn sets the rotation frequency of the compressor 1 back to the rotation frequency before the rotation frequency is increased in step S3.

[Control Flowchart 2]

FIG. 12 illustrates a control flowchart 2 for the indoor unit 11 according to Embodiment 1.

When the controller Cn determines, during the heating operation, that the floor heating device is on, the controller Cn maintains or increases the rotation frequency of the compressor 1.

(Step S10)

The controller Cn performs the heating operation. In step S10, the floor area B has been obtained, and the presence of the floor heating device has been determined.

(Step S11)

The controller Cn determines whether the floor heating device is on.

(Step S12)

The controller Cn determines whether a value obtained by subtracting a floor temperature Tfav, obtained from a detection result of the infrared sensor 9, from a temperature measured by the thermistor 8 is greater than or equal to β1 (predetermined temperature difference).

When the value is greater than or equal to β1, the process proceeds to step S13.

When the value is not greater than or equal to β1, the process proceeds to step S14.

(Step S13)

The controller Cn increases the rotation frequency of the compressor 1.

In this case, an increase may be a constant or may vary depending on the difference between the temperature measured by the thermistor 8 and the floor temperature Tfav obtained from the detection result of the infrared sensor 9. In other words, an increase in rotation frequency of the compressor 1 may be increased as the difference increases.

The value β1 is previously set in the controller Cn. The value β1 may be a variable or a constant.

Performing the process of the control flowchart 2 of FIG. 12 can obtain substantially the same advantageous effects as those obtained by performing the process of the control flowchart 1 of FIG. 10.

As regards the condition in step S2 in FIG. 10, the condition that a specified time has not elapsed since activation of the air-conditioning apparatus 10 may be used. Specifically, when the condition in step S2 or the condition that the specified time has not elapsed since the activation of the air-conditioning apparatus 10 is satisfied, the process proceeds to step S3. When neither of the conditions is satisfied, the process proceeds to step S4.

Furthermore, as regards the condition in step S12 in FIG. 12, the condition that the specified time has not elapsed since the activation of the air-conditioning apparatus 10 may also be used. Specifically, when the condition in step S12 or the condition that the specified time has not elapsed since the activation of the air-conditioning apparatus 10 is satisfied, the process proceeds to step S13. When neither of the condition is satisfied, the process proceeds to step S14.

When the air-conditioning apparatus 10 is activated, it is likely that the floor may be heated by the floor heating device but the indoor space may be at a low temperature, or may not be heated. Using the above-described configuration eases the conditions in steps S2 and S12, thus readily causing control for increasing the rotation frequency of the compressor 1. This configuration ensures that a reduction in user comfort is avoided.

[Modification of Control Flowchart 2]

Figure 13:
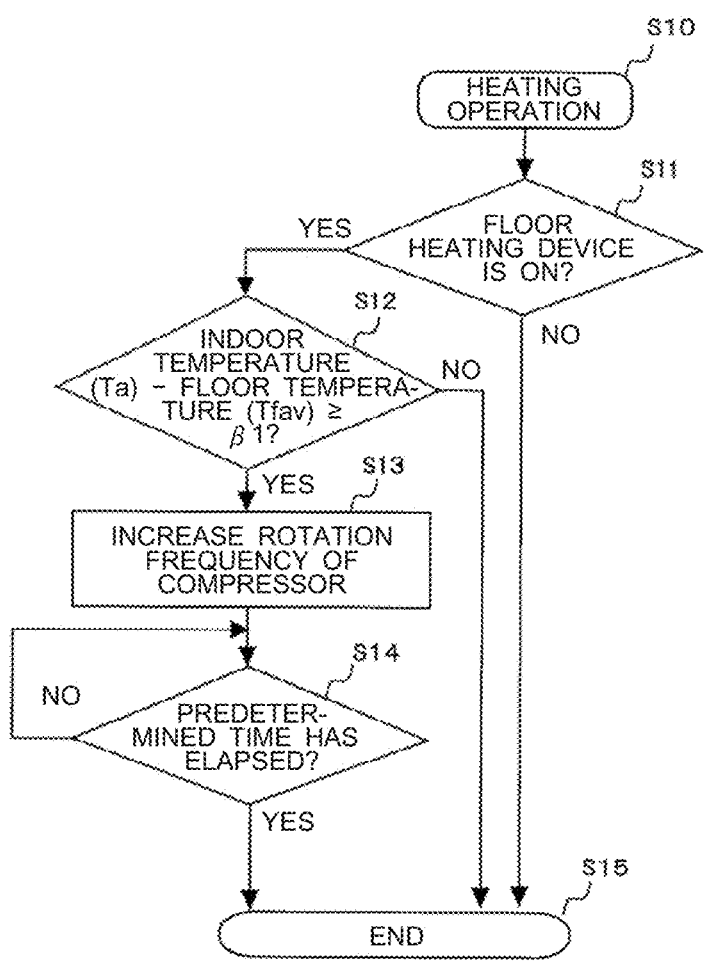
FIG. 13 illustrates a modification of the control flowchart 2 illustrated in FIG. 12.

FIG. 13 illustrates Modification of the control flowchart 2 illustrated in FIG. 12.

For the same intention as that in the flowchart illustrated in FIG. 11, the control flowchart 2 illustrated in FIG. 12 can be modified into a flowchart illustrated in FIG. 13. Specifically, a long heating operation raises warm air from below in the air-conditioned space, so that the entire air-conditioned space becomes heated. Consequently, the process of the control flowchart 2 illustrated in FIG. 12 is preferable to be performed temporarily. The control flowchart 2 according to the modification illustrated in FIG. 13 includes step S14. In step S14, the controller Cn determines whether a predetermined time has elapsed since the increase in the rotation frequency of the compressor 1 in step S13. Step S14 is repeated until the predetermined time elapses. When the predetermined time has elapsed, the process proceeds to step S15, and the control process is terminated. The operations in steps S11, S12, S13, and S15 in FIG. 13 are the same as those in steps S11, S12, S13, and S14 in FIG. 12.

When the process proceeds from step S14 to step S15, the controller Cn may reduce the rotation frequency of the compressor 1. For example, when the process proceeds from step S14 to step S15, the controller Cn sets the rotation frequency of the compressor 1 back to the rotation frequency before the rotation frequency is increased in step S13.

Advantageous Effects of Embodiment 1

According to Embodiment 1, whether the floor heating device is on is determined using the infrared sensor 9, and the rotation frequency of the compressor 1 is adjusted, thus achieving comfortable air-conditioning. In other words, in Embodiment 1, comfortable air-conditioning is achieved without communication with the floor heating device.

The indoor unit 11 of the air-conditioning apparatus 10 according to Embodiment 1 converts a detection result of the infrared sensor 9 into overall thermal image data D1 representing a temperature distribution within the infrared detection range of the infrared sensor 9, and determines, on the basis of floor thermal image data D2 that is included in the overall thermal image data D1 and represents a temperature distribution in the first direction Dr1 of the floor and the second direction Dr2 intersecting the first direction Dr1, whether the heating device is on. Thus, the accuracy of determination of whether the floor heating device is on can be increased.

The indoor unit 11 of the air-conditioning apparatus 10 according to Embodiment 1 can avoid a reduction in rotation frequency of the compressor 1 in a situation where the rotation frequency of the compressor 1 should not be reduced, even in the on state of the floor heating device. This configuration can reduce or eliminate a reduction in user comfort.

The indoor unit 11 of the air-conditioning apparatus 10 according to Embodiment 1 can increase the accuracy of detection of the on state of the floor heating device. Consequently, air-conditioning control adjusted for the operation of the floor heating device can be facilitated, thus reducing an increase in power consumption.

In Embodiment 1 described above, the indoor unit 11 is installed in the same space as the air-conditioned space. The indoor unit 11 and the air-conditioned space may be located in another manner. For example, the indoor unit 11 of the air-conditioning apparatus 10 may be installed outside the air-conditioned space, and the air outlet of the indoor unit 11 may communicate with the air-conditioned space via a duct. In such a case, the infrared sensor 9 may be separated from the casing 11A of the indoor unit 11, and may be disposed in the air-conditioned space.

[Modification 1]

Although the control target in FIGS. 10 and 11 is the compressor 1, the air-sending fan 5 can be a control target. Specifically, when the controller Cn determines, during the heating operation, that the floor heating device is on, the controller Cn adjusts the rotation frequency of the air-sending fan 5 on the basis of a set temperature and a sensible temperature obtained by subtracting a temperature correction value (correction value Co1) from a temperature measured by the temperature sensor (thermistor 8). When the difference between the set temperature and the sensible temperature is greater than or equal to a predetermined value, the controller Cn increases the rotation frequency of the air-sending fan 5. After the controller Cn increases the rotation frequency of the air-sending fan 5, the controller Cn may reduce the rotation frequency. For example, when a predetermined time has elapsed since the increase in the rotation frequency of the air-sending fan 5, the controller Cn sets the rotation frequency of the air-sending fan 5 back to the rotation frequency before the rotation frequency is increased.

Furthermore, when the difference between the set temperature and the sensible temperature is less than the predetermined value, the controller Cn maintains the rotation frequency of the air-sending fan 5. Such a configuration offers advantageous effects similar to those described with reference to FIGS. 10 and 11.

[Modification 2]

Although the control target in FIGS. 12 and 13 is the compressor 1, the air-sending fan 5 can be a control target. Specifically, when the controller Cn determines, during the heating operation, that the floor heating device is on, the controller Cn adjusts the rotation frequency of the air-sending fan 5 on the basis of a value obtained by subtracting the floor temperature Tfav, obtained from a detection result of the infrared sensor 9, from a temperature measured by the thermistor 8. When the value obtained by the subtraction is greater than or equal to β1 (predetermined temperature difference), the controller Cn increases the rotation frequency of the air-sending fan 5. After the controller Cn increases the rotation frequency of the air-sending fan 5, the controller Cn may reduce the rotation frequency. For example, when a predetermined time has elapsed since the increase in the rotation frequency of the air-sending fan 5, the controller Cn sets the rotation frequency back to the rotation frequency before the rotation frequency is increased.

When the value obtained by the subtraction is less than β1, the controller Cn maintains the rotation frequency of the air-sending fan 5. Such a configuration offers advantageous effects similar to those described with reference to FIGS. 12 and 13.

[Modification 3]

Although the control target in FIGS. 10 to 13 is the compressor 1, the vertical air-directing plate 6 can be a control target. Specifically, when the controller Cn determines that the floor heating device is on, the controller Cn adjusts the angle of the vertical air-directing plate 6 to increase an angle formed by the floor and a virtual plane that is parallel to the vertical air-directing plate 6 and intersects the floor. In other words, the vertical air-directing plate 6 is directed toward the floor. Consequently, the indoor unit 11 increases the amount of air supplied to lower part of the air-conditioned space, compared to that to upper part of the air-conditioned space. Such a configuration prevents the controller Cn from erroneously determining that, due to the floor heated by the floor heating device, the user does not feel cold.

Embodiment 2

In Embodiment 2, explanation of components and parts common to Embodiments 1 and 2 is omitted. The following description will be focused on differences from Embodiment 1. Embodiment 2 differs from Embodiment 1 in the third function. In Embodiment 1, the third function is to determine whether the floor heating device is on. In Embodiment 2, the third function is to determine the extent of a heated region of the floor heated by the floor heating device.

The controller Cn determines whether the area defined by the coordinates of element data items constituting first temperature range element data items is greater than or equal to a predetermined percentage p3 of the floor area B, and determines, on the basis of the determination result, the operation state of the floor heating device. The percentage p3 corresponds to a second percentage in the present invention.

In Embodiment 2, for example, the percentage p1 is 30% and the percentage p3 is 20%.

Figure 14:
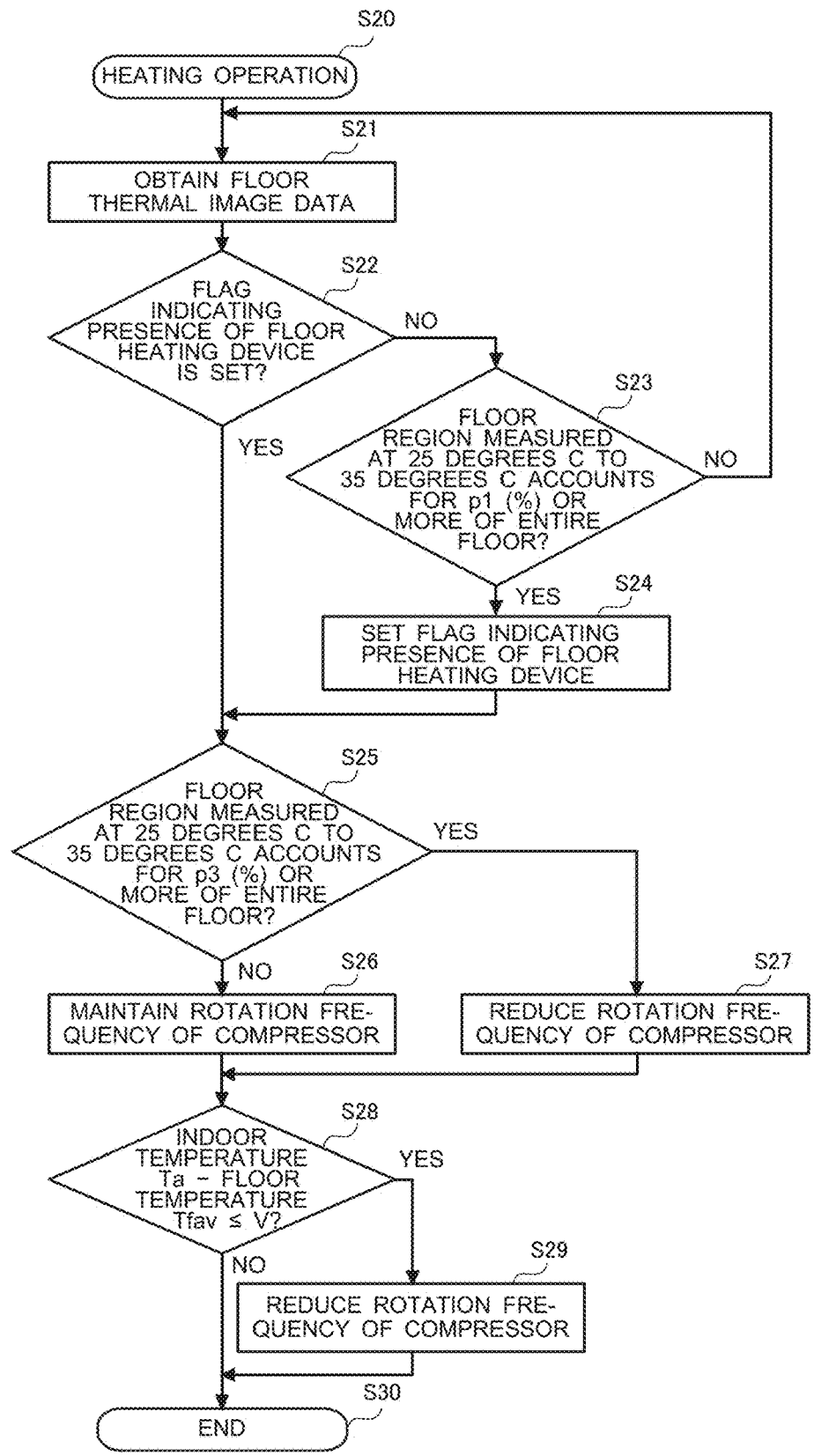
FIG. 14 illustrates a control flowchart for an indoor unit according to Embodiment 2 of the present invention.

FIG. 14 illustrates a control flowchart for an indoor unit 11 according to Embodiment 2.

(Step S20)

The controller Cn performs the heating operation (step S20).

(Step S21: First Function)

The controller Cn obtains floor thermal image data D2 on the basis of overall thermal image data D1. In other words, the controller Cn calculates the floor area B of the air-conditioned space.

(Step S22)

The controller Cn determines whether a flag indicating the presence of a floor heating device is set.

When the flag is set, the process proceeds to step S25.

When the flag is not set, the process proceeds to step S23.

(Step S23: Second Function)

The controller Cn determines whether the area defined by the coordinates of data items included in a predetermined temperature range of the floor thermal image data D2 is greater than or equal to the percentage p1 (e.g., 30%) of the floor area B. The data items included in the predetermined temperature range of the floor thermal image data D2 correspond to the first temperature range element data items. The predetermined temperature range ranges, for example, from 25 degrees C. to 35 degrees C.

When the range is greater than or equal to the percentage p1, the process proceeds to step S24.

When the range is not greater than or equal to the percentage p1, the process returns to step S21.

(Step S24)

The controller Cn sets the flag indicating the presence of the floor heating device.

(Step S25)

The controller Cn determines whether the area defined by the coordinates of data items included in a predetermined temperature range of the floor thermal image data D2 is greater than or equal to the percentage p3 (e.g., 20%) of the floor area B. The data items included in the predetermined temperature range of the floor thermal image data D2 correspond to the first temperature range element data items. The predetermined temperature range ranges, for example, from 25 degrees C. to 35 degrees C.

When the range is greater than or equal to the percentage p3, the process proceeds to step S27.

When the range is not greater than or equal to the percentage p3, the process proceeds to step S26.

(Step S26)

In step S26, the area defined by the coordinates of the element data items constituting the first temperature range element data items is less than the percentage p3 of the floor area B. The controller Cn maintains the rotation frequency of the compressor 1.

(Step S27)

In step S27, the area defined by the coordinates of the element data items constituting the first temperature range element data items is greater than or equal to the percentage p3 of the floor area B. The controller Cn reduces the rotation frequency of the compressor 1. A reduction can be set depending on the extent of the area defined by the coordinates of the element data items constituting the first temperature range element data items.

For example, the reduction is set to x1 when the area defined by the coordinates of the element data items constituting the first temperature range element data items is greater than or equal to 20% and less than 50% of the floor area B, the reduction is set to x2 when the range is greater than or equal to 50% and less than 80% of the floor area B, and the reduction is set to x3 when the range is greater than or equal to 80%. In this case, an in equation is satisfied that x3>x2>x1. In other words, a reduction in rotation frequency of the compressor 1 is increased as the area defined by the coordinates of the element data items constituting the first temperature range element data items increases.

(Step S28)

The controller Cn determines whether a value obtained by subtracting the floor temperature Tfav, obtained from a detection result of the infrared sensor 9, from a temperature (indoor temperature Ta) measured by the thermistor 8 is less than or equal to V (predetermined temperature difference). The floor temperature Tfav can be obtained by, for example, averaging temperatures represented by temperature data items included in element data items in a certain range.

When the obtained value is less than or equal to V, the process proceeds to step S29.

When the obtained value is not less than or equal to V, the process proceeds to step S30.

(Step S30)

The controller Cn terminates the control process illustrated in FIG. 14.

Advantageous Effects of Embodiment 2

In Embodiment 2, the infrared sensor 9 is used to obtain data on the extent of a heated region of the floor heated by the floor heating device, and the rotation frequency of the compressor 1 is adjusted on the basis of the obtained data, thus achieving comfortable air-conditioning. In other words, in Embodiment 2, comfortable air-conditioning can be achieved without communication with the floor heating device.

In Embodiment 2, as the heated region of the floor heated by the floor heating device increases, a reduction in rotation frequency of the compressor 1 is increased. This setting can reduce power consumption and increase the user comfort.

In Embodiment 2, the percentage p3 is less than the percentage p1. In other words, the percentage p1, which is greater than the percentage p3, tightens a criterion for determining the presence or absence of a floor heating device. This setting can avoid an erroneous determination of the presence or absence of a floor heating device. Furthermore, as the percentage p3 is less than the percentage p1, the rotation frequency of the compressor 1 can be appropriately adjusted in Embodiment 2 even when the heated region of the floor heated by the floor heating device decreases. Consequently, more finely adjusted air-conditioning can be achieved.

In Embodiment 2, the rotation frequency of the compressor 1 is adjusted on the basis of the indoor temperature Ta and the floor temperature Tfav. Specifically, the controller Cn reduces the rotation frequency of the compressor 1 when the floor temperature Tfav approaches the indoor temperature Ta. This operation can reduce the power consumption and increase the user comfort.

The invention claimed is:

1. An indoor unit of an air-conditioning apparatus, the indoor unit comprising:
    a casing;
    an infrared sensor disposed on the casing, the infrared sensor configured to detect infrared radiation emitted to an air-conditioned space; and
    a controller to which the infrared sensor outputs a detection result,
    the controller being configured to
    convert the detection result of the infrared sensor into overall thermal image data representing a temperature distribution within an infrared detection range of the infrared sensor,
    calculate, on a basis of the overall thermal image data, a floor area of the air-conditioned space,
    obtain, on a basis of the overall thermal image data, floor thermal image data including a plurality of element data items each including coordinates within the floor area and a floor temperature within the floor area associated with the coordinates, and
    determine, on a basis of the floor thermal image data, whether a floor heater in the air-conditioned space is in an on state, wherein
    the controller is further configured to determine a heated region within the floor area heated by the floor heater on a basis of the floor thermal image data,
    the floor thermal image data includes first temperature range element data items including element data items of the plurality of element data items each including floor temperature within a predetermined temperature range, and
    the on state of the floor heater is determined when an area defined by the coordinates of the element data items included in the first temperature range element data items is greater than or equal to a first percentage of the floor area that is predetermined.

2. The indoor unit of an air-conditioning apparatus of claim 1,
    wherein, to determine the heated region within the floor area heated by the floor heater, the controller is configured to determine whether the area defined by the coordinates of the element data items included in the first temperature range element data items is greater than or equal to a second percentage of the floor area that is predetermined.

3. The indoor unit of an air-conditioning apparatus of claim 2, wherein the second percentage is less than the first percentage.

4. The indoor unit of an air-conditioning apparatus of claim 2,
    wherein in a case where the area defined by the coordinates of the element data items included in the first temperature range element data items is less than the second percentage of the floor area, the controller is configured to maintain a rotation frequency of a compressor, and
    wherein in a case where the area defined by the coordinates of the element data items included in the first temperature range element data items is greater than or equal to the second percentage of the floor area, the controller is configured to reduce the rotation frequency of the compressor.

5. The indoor unit of an air-conditioning apparatus of claim 1, wherein the floor area of the air-conditioned space is obtained on a basis of temperature variations that is to be generated along a boundary portion between a floor of the air-conditioned space and a wall of the air-conditioned space.

6. The indoor unit of an air-conditioning apparatus of claim 1, the indoor unit further comprising:
    an air-sending fan disposed in the casing; and
    a temperature sensor configured to measure a temperature of the air-conditioned space, wherein in a case where the controller determines, during a heating operation, that the floor heater is in the on state, the controller is configured to adjust a rotation frequency of the air-sending fan on a basis of a set temperature of the air-conditioned space and a sensible temperature obtained by subtracting a temperature correction value from the temperature measured by the temperature sensor.

7. The indoor unit of an air-conditioning apparatus of claim 6, wherein the controller is configured to increase the rotation frequency of the air-sending fan in a case where a difference between the set temperature and the sensible temperature is greater than or equal to a predetermined value.

8. The indoor unit of an air-conditioning apparatus of claim 6, wherein the controller is configured to maintain the rotation frequency of the air-sending fan in a case where a difference between the set temperature and the sensible temperature is less than a predetermined value.

9. The indoor unit of an air-conditioning apparatus of claim 6, wherein in a case where the controller increases the rotation frequency of the air-sending fan, the controller is configured to reduce the rotation frequency of the air-sending fan when a predetermined time has elapsed.

10. The indoor unit of an air-conditioning apparatus of claim 1, the indoor unit further comprising:
an air-sending fan disposed in the casing; and
a temperature sensor configured to measure a temperature of the air-conditioned space,
wherein in a case where the controller determines, during a heating operation, that the floor heater is in the on state, the controller is configured to adjust a rotation frequency of the air-sending fan on a basis of a difference between the temperature measured by the temperature sensor and the floor temperature.

11. The indoor unit of an air-conditioning apparatus of claim 10, wherein the controller is configured to increase the rotation frequency of the air-sending fan in a case where the difference between the temperature measured by the temperature sensor and the floor temperature is greater than a predetermined temperature difference.

12. The indoor unit of an air-conditioning apparatus of claim 10, wherein the controller is configured to maintain the rotation frequency of the air-sending fan in a case where the difference between the temperature measured by the temperature sensor and the floor temperature is less than a predetermined temperature difference.

13. The indoor unit of an air-conditioning apparatus of claim 1, the indoor unit further comprising a vertical air-directing plate disposed in an air outlet of the casing,
wherein in a case where the controller determines that the floor heater is in the on state, the controller is configured to adjust an angle of the vertical air-directing plate to increase an angle formed by a floor and a virtual plane that is parallel to the vertical air-directing plate and intersects the floor.

14. The indoor unit of an air-conditioning apparatus of claim 1, wherein the controller is configured to calculate the floor area of the air-conditioned space before a compressor is activated or when operation start data is received from a remote control configured to transmit operation information.

15. An indoor unit of an air-conditioning apparatus, the indoor unit comprising:
a casing;
a temperature sensor configured to measure a temperature of the air-conditioned space;
an infrared sensor disposed on the casing, the infrared sensor configured to detect infrared radiation emitted to an air-conditioned space; and
a controller to which the infrared sensor outputs a detection result,
the controller being configured to
convert the detection result of the infrared sensor into overall thermal image data representing a temperature distribution within an infrared detection range of the infrared sensor,
calculate, on a basis of the overall thermal image data, a floor area of the air-conditioned space,
obtain, on a basis of the overall thermal image data, floor thermal image data including a plurality of element data items each including coordinates within the floor area and a floor temperature within the floor area associated with the coordinates, and
determine, on a basis of the floor thermal image data, whether a floor heater in the air-conditioned space is in an on state, wherein
the controller is further configured to determine a heated region within the floor area heated by the floor heater on a basis of the floor thermal image data, and
in a case where the controller determines, during a heating operation, that the floor heater is in the on state, the controller is configured to adjust a rotation frequency of one or more of a compressor and an air-sending fan on a basis of a set temperature of the air-conditioned space and a sensible temperature obtained by subtracting a temperature correction value from the temperature measured by the temperature sensor.

16. The indoor unit of an air-conditioning apparatus of claim 15, wherein the controller is configured to increase the rotation frequency of the compressor in a case where a difference between the set temperature and the sensible temperature is greater than or equal to a predetermined value.

17. The indoor unit of an air-conditioning apparatus of claim 15, wherein the controller is configured to maintain the rotation frequency of the compressor in a case where a difference between the set temperature and the sensible temperature is less than a predetermined value.

18. The indoor unit of an air-conditioning apparatus of claim 15, wherein in a case where the controller increases the rotation frequency of the compressor, the controller is configured to reduce the rotation frequency of the compressor when a predetermined time has elapsed.

19. An indoor unit of an air-conditioning apparatus, the indoor unit comprising:
a casing;
a temperature sensor configured to measure a temperature of an air-conditioned space,
an infrared sensor disposed on the casing, the infrared sensor configured to detect infrared radiation emitted to an air-conditioned space; and
a controller to which the infrared sensor outputs a detection result,
the controller being configured to
convert the detection result of the infrared sensor into overall thermal image data representing a temperature distribution within an infrared detection range of the infrared sensor,
calculate, on a basis of the overall thermal image data, a floor area of the air-conditioned space,
obtain, on a basis of the overall thermal image data, floor thermal image data including a plurality of element data items each including coordinates within the floor area and a floor temperature within the floor area associated with the coordinates, and determine, on a basis of the floor thermal image data, whether a floor heater in the air-conditioned space is in an on state, wherein the controller is further configured to determine a heated region within the floor area heated by the floor heater on a basis of the floor thermal image data, and in a case where the controller determines, during a heating operation, that the floor heater is in the on state, the controller is configured to adjust a rotation frequency of one or more of a compressor and an air-sending fan on a basis of a difference between the temperature measured by the temperature sensor and the floor temperature.

20. The indoor unit of an air-conditioning apparatus of claim 19, wherein the controller is configured to increase the rotation frequency of the compressor in a case where the difference between the temperature measured by the temperature sensor and the floor temperature is greater than a predetermined temperature difference.

21. The indoor unit of an air-conditioning apparatus of claim 19, wherein the controller is configured to maintain the rotation frequency of the compressor in a case where the difference between the temperature measured by the temperature sensor and the floor temperature is less than a predetermined temperature difference.

* * * * *